United States Patent [19]

Parshall

[11] Patent Number: 4,777,397

[45] Date of Patent: Oct. 11, 1988

[54] PERMANENT MAGNET GENERATOR APPARATUS INCLUDING A CONSEQUENT POLE ROTOR

[75] Inventor: Millis V. Parshall, Erie, Pa.

[73] Assignee: Marathon Electric Manufacturing Corp., Wausau, Wis.

[21] Appl. No.: 897,133

[22] Filed: Aug. 15, 1986

[51] Int. Cl.[4] .............................................. H02K 21/14
[52] U.S. Cl. ........................................ 310/156; 310/261
[58] Field of Search ............... 310/42, 43, 153, 156, 310/187, 186, 216, 217, 218, 261, 181; 29/598

[56] References Cited

U.S. PATENT DOCUMENTS

| | | | |
|---|---|---|---|
| 2,485,474 | 10/1949 | Brainard | 310/156 |
| 2,754,440 | 7/1956 | Brainard | 310/156 |
| 2,756,356 | 7/1956 | Brownlee et al. | 310/156 |
| 3,836,802 | 9/1974 | Parker | 310/154 |
| 3,858,308 | 1/1975 | Peterson | 29/598 |
| 3,900,749 | 8/1975 | Carriker | 310/156 |
| 3,979,821 | 9/1976 | Noodleman | 29/598 |
| 4,025,840 | 5/1977 | Brissey et al. | 322/52 |
| 4,139,790 | 2/1979 | Steen | 310/156 |
| 4,167,684 | 9/1979 | Kelly | 310/80 |
| 4,302,693 | 11/1981 | Burgmeier et al. | 310/156 |
| 4,433,261 | 2/1984 | Nashiki et al. | 310/156 |
| 4,504,755 | 3/1985 | Semones et al. | 310/156 |
| 4,533,891 | 8/1985 | Vanderlaan et al. | 335/272 |
| 4,547,713 | 10/1985 | Langley et al. | 318/254 |
| 4,549,341 | 10/1985 | Kasablan | 29/598 |
| 4,568,642 | 2/1986 | DeForrest et al. | 433/132 |
| 4,631,435 | 12/1986 | McCarty | 310/156 |

Primary Examiner—Patrick R. Salce
Assistant Examiner—D. L. Rebsch
Attorney, Agent, or Firm—Andrus, Sceales, Starke & Sawall

[57] ABSTRACT

A permanent magnet generator has a laminated rotor mounted to the driven shaft of a power alternator. The rotor is cylindrical and includes 10 circumferentially distributed elongated axial slots and 10 rotor teeth. Iron-boron-neodymium rare earth magnets are secured within each of the slots, radially and similarly polarized. The magnet and teeth define a consequent 20 pole rotor with a minimum number of magnets. The rare earth magnets are epoxy bonded within each of the corresponding slots. Each slot has a rectangular cross-section with slightly flared sides. The epoxy extends between the recess surfaces and the magnets. The flared sides improve the flux distribution. The outer radial ends of the magnets spaced inwardly of the rotor teeth prevent mechaical damage to the magnets. The outside maximum dimension of the PMG stator is slightly less than the inner diameter of the exciter stator for convenient removal through the bore of the exciter.

15 Claims, 2 Drawing Sheets

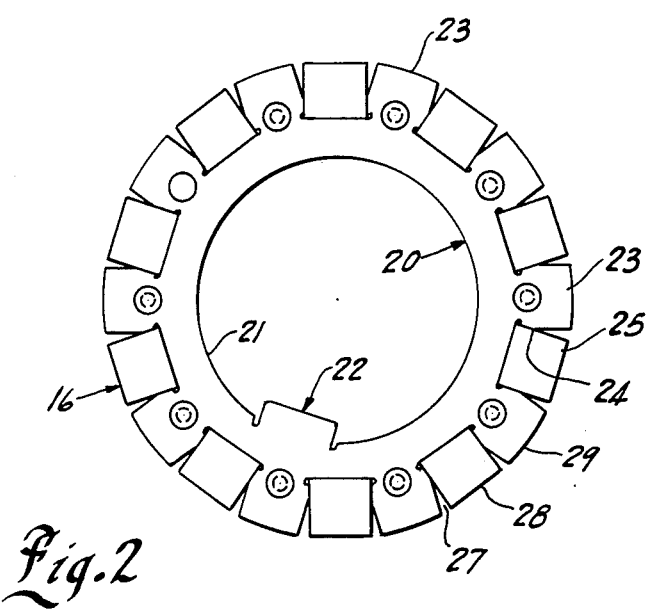
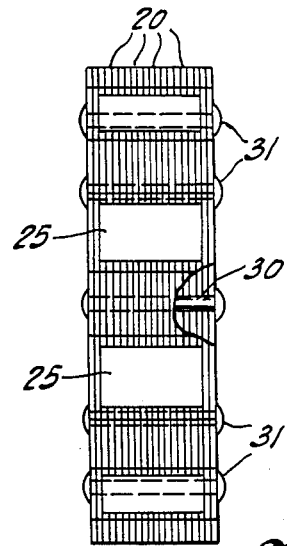
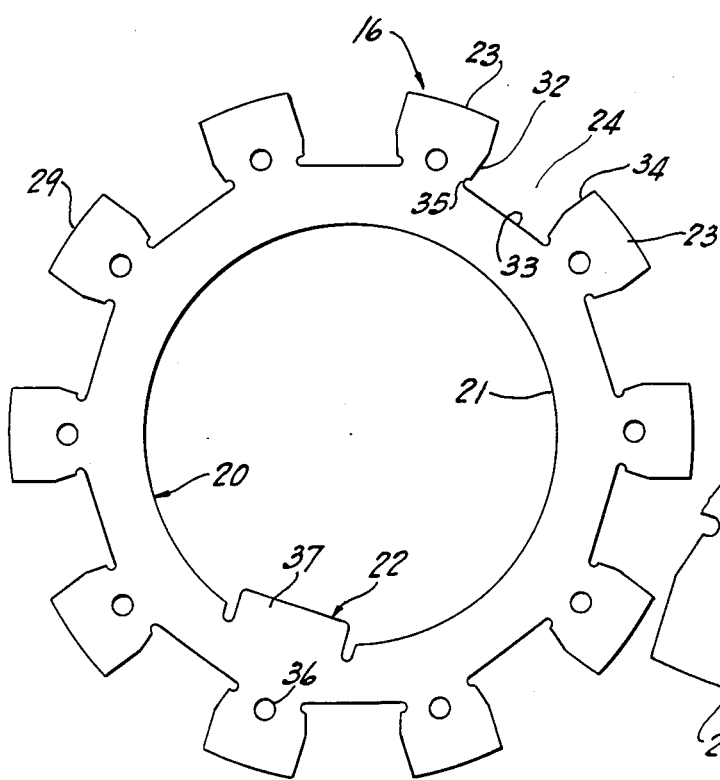
Fig. 2
Fig. 3
Fig. 5
Fig. 4
Fig. 6

PERMANENT MAGNET GENERATOR APPARATUS INCLUDING A CONSEQUENT POLE ROTOR

BACKGROUND OF THE PRESENT INVENTION

This invention relates to a permanent magnet generator apparatus and particularly to such a generator apparatus adapted for energizing of a voltage regulator of an regulated alternator system.

Permanent magnet generators have been available for many years. The generators are of an advantageous construction and may employ permanent magnets, limiting the necessity for a separate power supply for excitation of the generator. The advantage associated with permanent magnets has been significantly increased with the advance in the construction and availability of materials for permanent magnets. Various rare earth metals provide high strength permanent magnets having a long magnetic life. Permanent magnet generators have generally been more or less restricted to precision generators and particularly generators in which the mechanical and centrifugal forces on the magnets are not severe. Rare earth magnets are particularly brittle and particularly subject to mechanical damage. The holding means on the magnets, particularly where large forces are present, require careful mechanical construction. The constructional limitations have limited the use in certain applications.

For example, relatively large alternators which are driven by engines, turbines and other prime movers are widely used in industry to provide an alternating current power supply. Three-phase alternators providing voltages of 240/480 volts are commonly commercially marketed. Such alternators universally include a regulator for regulation of the voltage, current and/or frequency. The regulator requires a logic power supply.

The alternators are also provided with appropriate excitation from an exciter generator which is coupled to the common shaft with the alternator. The output of the exciter is rectified and coupled to the field winding of the alternator. The regulator and exciter may be powered through a feedback coupling to the output of the alternator. In many applications, a separate power supply is advantageously used for powering the voltage regulator and the exciter. Permanent magnet generators are adapted to such use and have been used commercially in such structures. In such construction, the permanent magnet rotor of the generator is conventionally mounted to the common shaft unit with the alternator field rotor and the exciter rotor winding. A stationary three phase output winding is connected through a suitable rectifying and signal processing circuit to provide the necessary power to the voltage regulator and to the exciter. The permanent magnet generator of a conventional construction is a reasonably large heavy device and has been mounted outboard of the exciter. In at least one instance, the alternator has been mounted inboard of the exciter, that is, between the exciter and the main alternator. The permanent magnet generators have generally applied relatively large permanent magnet members secured in side-by-side relation circumferentially about the rotor base, and with adjacent magnets oppositely polarized. A suitable mechanical keeper in the form of a heavy band is clamped about the magnets to hold the magnets in place. This construction is necessary because of the large centrifugal forces on the magnets and the requirement of establishing a stable and reliable high force support of the magnets.

Although such systems have been used in commercial devices and provide a satisfactory alternator operation with the general advantages provided by the separate power supply, the permanent magnet generator is relatively large and presents certain difficulties from the standpoint of suitable construction not only of the generator but the mounting of the generator within and as a part of the main alternator system. Although a permanent magnet generator using rare earth permanent magnets would appear to be advantageously used, the nature of such magnets and the large forces and environment in an alternator makes the use of such magnets difficult, and the present inventor knows of no such use.

There is a distinct need for a small, compact permanent magnet generator which can be applied to and integrated into an alternator unit. Such permanent magnet generator may of course also advantageously be applied to other applications.

The permanent magnet generator must be particularly adapted to an economic commercial implementation, generally requiring the use of mass production technology which is presently commercially available.

SUMMARY OF THE PRESENT INVENTION

The present invention is particularly directed to a permanent magnet generator producing a greater power output for any given size and which can be constructed with a compact high speed rotor, and particularly such a generator which can be directly driven as an integrated part of a regulated alternator adapted to produce commercially demanded voltages and currents.

Generally in accordance with the teaching of the present invention, the permanent magnet generator is formed with a cylindrical rotor adapted to be driven from a suitable prime mover such as that used in driving a power alternator. The cylindrical rotor includes circumferentially distributed enlongated slots separated by corresponding rotor teeth. The rotor is preferably a laminated assembly formed of magnetic material such as a magnetic steel presently used in stator and rotor construction. In accordance with the present invention, rare earth magnets are secured within each of the slots and radially polarized to define permanent magnetic poles, with the flux passing through the adjacent rotor and stator cores and the air gaps therebetween. The permanent magnets are all similarly polarized, with the flux passing through the adjacent magnetic core teeth generating opposite polarized poles, and defining a consequent pole rotor unit. The consequent pole construction of the generator thus uniquely reduces the number of magnets required and adapts the rotor to the use of the rare earth magnets in producing a relatively small compact unit.

In a preferred unique structure, the rare earth magnets are adhesively bonded within each of the corresponding slots to effectively permanently affix the magnets in place. The adhesive bonding eliminates the stresses placed on the magnets normally encountered with a mechanical keeper or the like. The inventor has found that an appropriate adhesive bonding of the magnets permits the retention of the magnets at the high speed operation encountered in the conventional regulated engine driven alternator systems.

The permanent magnets are fabricated from a suitable magnetic rare earth metal which is known to provide a strong permanent magnetic field per unit of volume or size. The present inventor has discovered that iron-boron-neodymium provides an optimum material. The iron-boron-neodymium produces a desired high strength magnetic field with a minimum cost. The material can be conveniently mass produced in the desired rectangular elongated bar-like shape and highly magnetized to produce a high strength magnet. The formed magnets are adapted to adhesive bonding within the several rotor slots. The outer surface and face of each magnet is spaced slightly inwardly from the outer surface of the rotor teeth, thereby protecting the relatively fragile magnets from mechanical damage during handling and operation.

The rare earth permanent magnets permit reduction in the overall diameter and size of the generator and particularly the rotor. Consequently, the centrifugal forces on the magnets are somewhat less than that which would be encountered in the permanent magnet generator heretofore used as a part of an integrated regulated alternator system.

In the preferred construction of the generator unit for an alternator control, the outside maximum dimension of the stator of the generator was slightly less than the inner diameter of the exciter stator. This permits mounting of the generator inboard of the exciter with the convenient removal of the permanent magnet generator through the bore of the exciter for service if necessary.

The present invention thus provides a significantly improved generator where size is significant for any given power output. The rotor is readily constructed using present day materials, as well as forming and assembly technology to permit commercial implementation of the invention.

BRIEF DESCRIPTION OF DRAWINGS

The drawings furnished herewith generally illustrate the best mode presently contemplated for the invention and is described hereinafter.

In the drawings:

FIG. 2 is an enlarged vertical section taken generally on line 2—2 of FIG. 1 and illustrates the permanent magnet generator structure;

FIG. 3 is a side view of the rotor shown in FIG. 2 with parts broken away to show the inner surface of the rotor;

FIG. 4 is an enlarged fragmentary view of the rotor of FIGS. 2-3 and illustrating the securement of the rotor magnets;

FIG. 5 is a view of a rotor lamination shown in FIGS. 2-4; and

FIG. 6 is a pictorial view of the permanent magnet shown in FIGS. 1 and 2.

DESCRIPTION OF THE ILLUSTRATED EMBODIMENT

Figure 1:
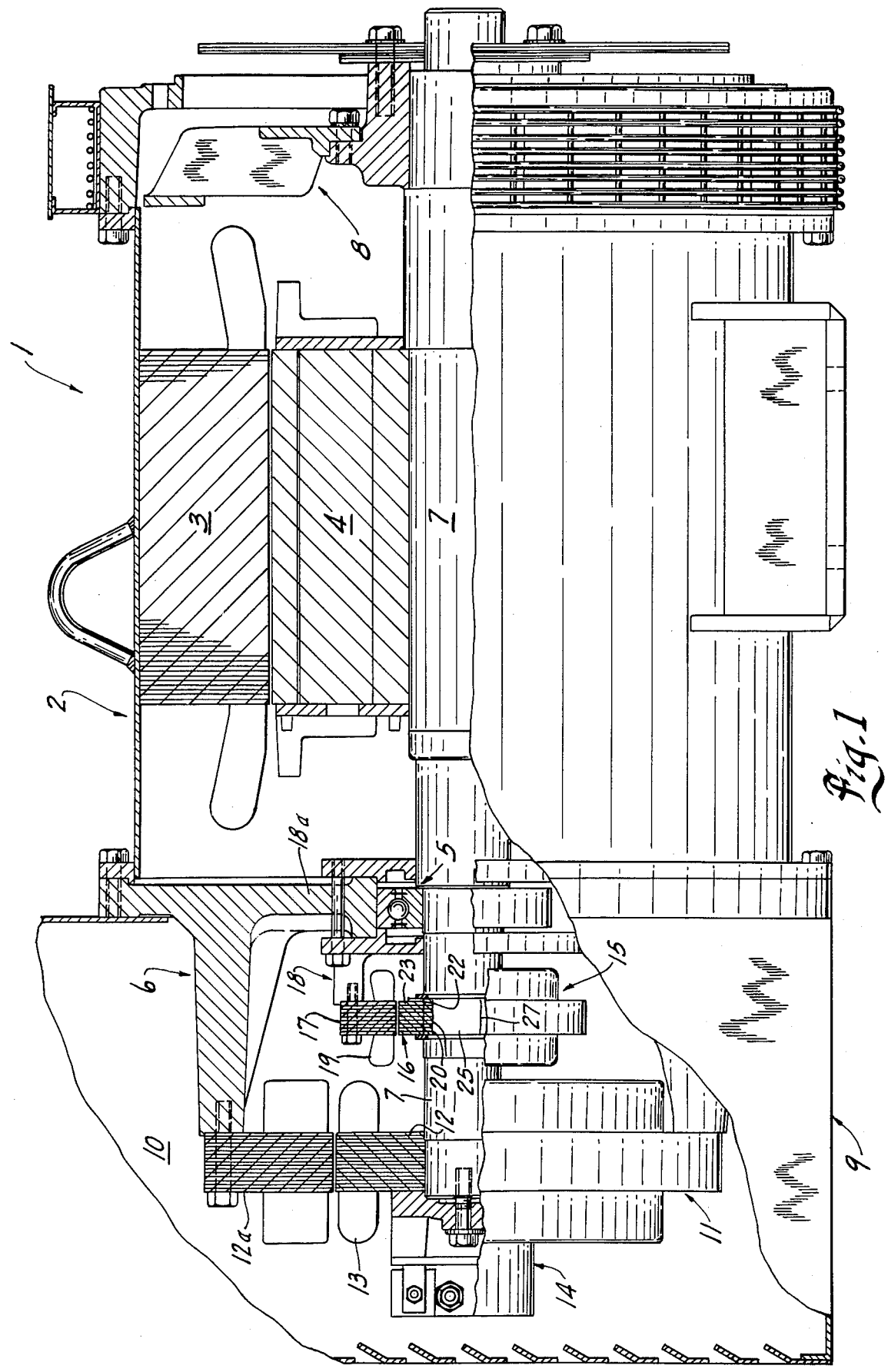
FIG. 1 is an elevational view of an engine driven alternator unit with part broken away to illustrate the location and interrelationship of the several components including a permanent magnet generator constructed in accordance with the teaching of the present invention.

Referring to the drawing and particularly to FIG. 1, an alternator unit 1 is illustrated adapted to be driven by an internal combustion engine or other suitable prime mover, now shown. The alternator unit includes a main power alternator 2 adapted to generate commercially usable power, such as a three phase 480 volt output, for energizing of electrical devices, such as motors, heating units and other high power loads. The alternator 2 is a rotating field alternator having a fixed output stator 3 with a rotating field rotor 4 rotatably mounted therein. The rotor 4 is supported at the opposite ends of the alternator in suitable precision bearings 5 fixedly mounted as a part of a fixed base structure 6 for supporting of the rotor for high speed rotation. The rotor shaft 7 extends from the opposite ends of the alternator 2 with a fan unit 8 secured to the driven end for establishing air flow through the alternator 2 for cooling thereof. The opposite end of the shaft 7 extends outwardly of the bearing 5 and terminates within a control box or housing 9. An alternator regulator unit 10 (not shown) is housed within the upper portion of the housing 9 and is operational to regulate the alternator output, including the voltage and current levels. The rotating field 4 of the alternator 2 is energized from a generator exciter unit 11 secured to the outer end of the alternator shaft 7 with housing 9 for simultaneous rotation and operation. The exciter unit 11 includes a rotor 12 fixed to the alternator shaft 7 for rotation within an outer fixed stator unit 12a with the rotating of the field unit 4. The exciter output winding 13 is connected to a full wave rectifier circuit board unit 14 secured to the outer end of the shaft for simultaneous rotation with the rotor.

A permanent magnet generator 15 is mounted between the exciter 11 and the main alternator bearing 5 and includes a rotor 16 secured to the alternator shaft 7. An annular fixed stator 17 is mounted by a suitable rigid bracket 18 to the alternator front bracket or end bell 18a. The stator 17 includes a single phase or three phase output winding 19, depending upon the design. The output of the generator winding 19 is connected to power the regulator 10 and the exciter 11. Thus the regulator power supply is maintained independently of the output of the alternator 2 to maintain regulated energization of the exciter 11 and thereby energization of the alternator.

The present invention is particularly directed to the construction of the permanent magnet generator 15. As more fully developed presently, the generator 15 is especially constructed as a small compact unit particulary adapting the mounting as a part of the integrated alternator assembly inboard of the exciter 11 and particularly immediately adjacent the main alternator bearing 5. The compact generator 15 is uniquely interrelated to the exciter 11, in that the generator 15 including the stator unit 17 is readily disassembled and removed through the exciter stator bore for servicing and the like. The compact unit 15 does not interfere with the longitudinal air flow through the housing 9 and the alternate 2 and thus permits effective cooling of the alternator structure.

Referring to FIGS. 2-5, the rotor 16 is a laminated structure including a plurality of like laminations 20. The rotor 16 is formed as an annular member having a central opening 21 corresponding to the shaft 7 to which it is affixed by keyed connection 22. The rotor 16 is specially constructed as a consequent pole rotor having a plurality of radial teeth 23 and corresponding magnet slots 24. Permanent magnets 25 are secured one each in each slot 24. The permanent magnets 25 are similarly radially polarized such as shown in FIG. 2 and establish a flux path 26 through the rotor 16. The flux in the pole teeth 23 generate opposite polarity poles to establish the consequent pole operation. The rotor 16 thus only requires one-half the total number of magnets generally used in a generator for similar use. The permanent magnets 25 are formed of a rare earth material, and preferably iron-boron-neodymium. Such material is readily magnetized to produce a long-life magnet producing a strong magnetic field per unit of material. The magnet member of such material is a rather fragile member and should be subjected to minimum mechanical forces. In accordance with a preferred construction, the magnets 25 are secured in slots 24 by a suitable adhesive 27 which bonds to the adjacent surfaces of the slots 24 and the magnets 25 to securely mount the magnets in place.

The magnet 25 is also specially formed to have a radial depth slightly less then the depth of the teeth 23 and the recesses 24. The outer surface or face 28 of the magnet 25 is located within the recess and the outer face 29 of the teeth 23 and is thereby protected from mechanical damage.

More particularly, each lamination 20 is stamped from a conventional magnetic core material such as 0.022 thick steel in the shape of a generally annular lamination. The inner diameter of the annular lamination closely approximates the diameter of the alternator shaft to which the permanent magnet rotor is secured.

The laminations 20 are assembled in appropriately stacked relation and firmly clamped as an integrated assembly, to form the annular rotor member. In the illustrated embodiment of the invention, the stack of laminations 20 are interconnected by a plurality of circumferentially distributed rivet members 30 which projects through the stack of laminations and the opposite rivet ends are swaged as at 31 to securely clamp the lamination into an integrated magnetic core.

As more clearly shown in FIG. 5, each rotor slot 24 is similarly formed during the stamping of the lamination. The slot 24 is generally a rectangular shaped slot having a width somewhat slightly in excess of the width of the adjacent teeth. The sidewalls of the slot 24 include an inner portion with substantially straight or inwardly flared walls 32 extending outwardly of the recess base 33 and outer flared sidewalls 34 which flare outwardly from the inner walls 32 by small outwardly curved recesses 35. The rivet opening 36 is formed in the lamination of the base portion of each tooth 23.

The rare earth permanent magnets 25 are formed as elongated solid blocks having a rectangular cross section which generally mate with the slots. The width of the magnet 25 is slightly less than the smallest width of the base portion of the slot 24 and the depth of the magnet 25 is also slightly less than the radial depth of the slot 24. The magnet is set into the slot 24 with the interposed layer of adhesive 27 between the base 33 and the side walls 32 and 34 of the magnet 25 and the slot 24. The adhesive 27 forms a relatively thin bonding layer and is selected to form a firm bond and interconnection to the laminations and to the adjacent base and sidewalls surfaces of the magnet 25.

Although any suitable adhesive can be applied, the inventor has found an epoxy adhesive produces a particularly satisfactory and reliable attachment of the magnet within the slot for effectively permanently affixing of the magnet in place under all anticipated operating conditions.

The flared sidewalls 34 of the slots 24 provide a somewhat larger air gap immediately adjacent the outer face 28 of the rotor magnet 25. The flared portions minimize the leakage flux immediately adjacent the side edges of the magnets and contributes to the desired flux movement from the magnets 25 to the stator 17.

The flared portions within the slots also provide a somewhat increased spaced filled with the epoxy adhesive and contribute to a strong adhesive bonding of the permanent magnets within the rotor slots.

Thus in a typical embodiment of the invention, the rotor was formed with dimensions in inches approximately as follows.

The outer diameter of the rotor was 4.570 inches and the inner diameter of 2.70. The rotor had 10 equicircumferentially spaced teeth. Each slot had the inner width of 0.630 inches adjacent the base portion and flared outwardly therefrom to a maximum dimension of 0.820 inches. The total depth of the inner portion adjacent the base was 0.225 inches and the flared portion 0.269 inches. The sidewalls were joined to a flat base by generally semicircular recesses. A shaft key 37 was formed as shown with a width of about 0.745.

The shaft 7 is formed with a machined surface to which the rotor 16 is secured. The shaft is provided with a connecting keyway 38 and the permanent magnet rotor is formed with the corresponding mating key 37. The key is shown with a significant circumferential dimension to provide a firm strong interlock between the rotor and the shaft.

The stator core 17 of the permanent magnet generator 17 is formed as a generally square stator unit having a circular opening within which the rotor is rotatably mounted. The single or three phase winding 17 is wound within the slotted stator for generating the appropriate output voltage and current for powering of a voltage regulator or the like. The stator core 17 is a laminated structure and constructed to the form having a relatively square peripheral configuration. The enlarged corner portions of the core are apertured to receive the mounting bolts.

The main exciter 11 is mounted outboard of the permanent magnet generator and consists of a fixed annular stator 12a fixedly mounted to the front bracket 18a. An exciter rotor 12 is secured to the alternator shaft. The alternator shaft 7 terminates just outwardly of the exciter. A full wave rectifier board 14 is secured to the end of the shaft. The full wave rectifier has its input connected to the output of the exciter and its output connected by suitable leads to the rotating field of the main alternator. The field of the exciter is stationary and the excitation thereof is controlled by the regulator to control the output of the exciter and thereby the excitation of the main rotating field of the alternator.

The permanent magnet generator output is connected from the stationary output single or three phase output winding to power the voltage regulator for controlling the exciter and thereby the main alternator.

A small compact permanent magnet alternator is highly desirable to provide a compact overall alternator assembly. The main alternator requires a forced cooling system and a fan means is generally connected to the opposite end of the shaft opposite the engine drive. A compact overall assembly permits proper movement of air through the main alternator.

Various modes of carrying out the invention are contemplated as being within the scope of the following claims particularly pointing out and distinctly claiming the subject matter which is regarded as the invention.

I claim:

1. A permanent magnet generator rotor adapted to be mounted within a stator having a cylindrical surface, comprising a cylindrical rotor core having a plurality of circumferentially spaced rotor poles having cylindrical outer surfaces with a diameter slightly less than said stator and defining slots extending longitudinally of the rotor core, each of said slots having an essentially constant circumferential width throughout the inner portion of the slot and with the outer portions of the slot flared outwardly, a permanent magnet formed of a rare earth magnetic material secured within each of said slots with a radially outer exposed surface extended over the width of said inner portion of the slots, said radially outer exposed surface of each of said magnets totally located radially inwardly of the cylindrical outer surface of the rotor core over the complete width of said slot by a depth only required to prevent engagement with the stator cylindrical surface.

2. A permanent magnet generator rotor adapted to be mounted within a stator having a cylindrical surface, comprising a cylindrical rotor core having a plurality of circumferentially spaced rotor poles having cylindrical outer surfaces with a diameter slightly less than said stator and defining slots extending longitudinally of the rotor core, each of said slots having an essentially constant circumferential width throughout the slot, a permanent magnet formed of a rare earth magnetic material secured within each of said slots with a radially outer exposed surface extended over the width of the slot, said radially outer exposed surface of each of said magnets totally located radially inwardly of the cylindrical outer surface of the rotor core over the complete width of said slot by a depth only required to prevent engagement with the stator cylindrical surface, wherein each of said slots includes a substantially flat base and sidewalls including a first inner portion and a second outer portion flaring outwardly and laterally, said magnets having parallel flat sidewalls and a width slightly less than the width of said slot.

3. A permanent magnet generator rotor adapted to be mounted within a stator having a cylindrical surface, comprising a cylindrical rotor core having a plurality of circumferentially spaced rotor poles having cylindrical outer surfaces with a diameter slightly less than said stator and defining slots extending longitudinally of the rotor core, each of said slots having an essentially constant circumferential width throughout the slot, a permanent magnet formed of a rare earth magnetic material secured within each of said slots with a radially outer exposed surface extended over the width of the slot, said radially outer exposed surface of each of said magnets totally located radially inwardly of the cylindrical outer surface of the rotor core over the complete width of said slot by a depth only required to prevent engagement with the stator cylindrical surface, including an adhesive interposed between said magnets and all opposed surfaces of said slots, said adhesive securing said magnets in said slots.

4. The generator rotor of claim 3 wherein said rotor poles have a circumferential width less than that of said slots.

5. The generator rotor of claim 4 wherein the sidewalls of said poles and slots have an outer portion which flares circumferentially to produce an enlarged opening to said slot.

6. The generator rotor of claim 5 wherein said rare earth magnetic material is iron-boron-neodymium.

7. The generator rotor of claim 3 wherein said rare earth magnetic material is iron-baron-neodymium.

8. A permanent magnet generator rotor apparatus, comprising a cylindrical rotor core having a plurality of circumferentially spaced outwardly flared surface slots extending axially of the rotor core, a rectangular permanent magnet secured within each of said slots, each of said magnets being a solid magnet formed of iron-boron-neodymium and being similarly located radially inwardly of the outer cylindrical surface of the rotor core, and including an adhesive in each slot interposed between said magnets and opposed surfaces of said slot, said adhesive forming the sole support of said magnets in said rotor core.

9. A regulated alternator unit comprising a support base structure, an alternator having a rotating field rotor including a shaft, a bearing means secured to one end of said alternator, said shaft extending from said bearing means, a permanent magnet generator having a rotor secured to said shaft immediately outboard of said bearing means and a stator mounted to said base structure, said rotor having a plurality of circumferentially spaced surface slots extending longitudinally of the rotor, a permanent magnet formed of a rare earth magnetic material secured within each of said slots, and an exciter having a rotor secured to the shaft outboard of said generator and having a exciter stator secured to said base structure, said exciter stator having a rotor opening of a diameter in excess of the maximum width of said stator of said generator.

10. The regulated alternator unit of claim 9 wherein an epoxy adhesive is interposed between said magnets and opposed surfaces of said slots, said epoxy adhesive forming the sole support of said magnets in said rotor.

11. A regulated alternator unit comprising an alternator having a rotating field rotor including a shaft and an excitation winding unit, a permanent magnet generator having a permanent magnet rotor secured to said shaft, said rotor having a lamination core of single piece laminations and having a plurality of circumferentially spaced rotor teeth defining surface slots extending axially of the rotor, a permanent magnet secured within each of said slots and said magnets having the same radial polarization and exposed outer surfaces and with the adjacent rotor teeth defining a consequent pole generator, said generator having an output winding connected to said excitation winding unit to excite said alternator.

12. The regulated alternator unit of claim 11 wherein said magnets have an outer surface spaced radially inwardly of the outer cylindrical surface of the rotor teeth.

13. The regulated alternator unit of claim 11 wherein an adhesive is interposed between said magnets and opposed surfaces of said slots, said adhesive supporting said magnets in said rotor.

14. A permanent magnet generator rotor, comprising a cylindrical lamination rotor core of single piece laminations having a plurality of circumferentially spaced rotor poles defining slots extending axially of the rotor core, and permanent magnets secured within each of said slots and said magnets each having the same radial polarization and exposed outer surfaces to form a consequent pole rotor for a permanent magnet rotor machine, including an adhesive interposed between said magnets and opposed surfaces of said slots and securing said magnets in said slots.

15. The regulated alternator unit of claim 9 wherein said magnets have an outer surface spaced radially inwardly of the outer cylindrical surface of the rotor.

* * * * *